United States Patent Office 2,717,836
Patented Sept. 13, 1955

2,717,836

PROCESS OF CONVERTING UREA

Julius Brody, Dorchester, Mass.

No Drawing. Application July 31, 1951,
Serial No. 239,638

20 Claims. (Cl. 99—7)

This invention consists in a process of converting urea in products of urea-induced solubilization of proteins to additional food values whereby the urea as such is substantially removed from the proteinaceous material.

In the copending application of the present inventor, Serial No. 239,637, filed July 31, 1951, there is described a process of converting certain proteinaceous materials such as fish protein and the entrails of poultry and mammals to fluid form by adding urea to the proteinaceous material. An amount of urea sufficient to inhibit biological decomposition is used in that process. The presence of urea in the liquefied product appears to make it impossible to dry the product to a powder.

The present invention provides a process of removing the urea from the liquefied product by converting it to desirable food values which are nutritionally assimilable by poultry and animals. Not only is the nutritional value of the food supplement greatly enhanced by this process, but also, the product so treated may be dried to a fine powder which is more easily handled, shipped and admixed with animal feeds to enrich them than is the liquid product. Furthermore, the dried powder resulting from the treatment of solubilized fish entrails possesses no characteristic fishy odor, but rather has the pleasant aroma of beef bouillon.

This invention makes use of the growth process of yeast and is essentially a process of utilizing the urea as a yeast food and converting it to yeast cells—which are valuable as an enriching food supplement.

The process of my copending application results in a well preserved mixture of solubilized proteinaceous products and urea. The product has a sufficiently high concentration of urea to prevent the occurrence of biological processes including fermentation, probably because all living organisms are also solubilized.

It is accordingly proposed that the urea-containing products prepared according to the method outlined in my copending application be first diluted with water to reduce the concentration of urea and bring it within the fermentable range, of less than about 6–7%. Thereafter conditions favorable for yeast growth are established in the liquid and yeast is added and allowed to grow until substantially all the urea is assimilated.

It has been found necessary to add a small amount of fermentable sugar to the mixture in order that yeast growth may proceed satisfactorily. Fermentation is preferably carried out under conditions favoring utilization of the sugar in the growth and multiplication of the yeast cells with a minimum of alcohol formation. Such conditions include a moderately acidic medium and an abundance of free or dissolved oxygen.

By the technique just outlined it is possible to remove a considerable portion of the urea from the proteinaceous product, but it has been further found that the remaining urea may also be both removed and the nitrogenous fractions thereof substantially entirely converted to yeast cells by adding urease to the mixture. The urease is a selective enzyme which converts urea to ammonia and carbon dioxide and the yeast cells avidly assimilate ammonia and its salts in their growth process. Accordingly, it will be seen that this invention provides a practical method of removing urea from the proteinaceous product and converting it to valuable food products. The resulting product is considerably enriched in supplemental food values and it may now be readily dried by any of the conventional techniques, e. g. spray drying. The possibility of drying the product promises lower transportation charges and easier mixing of the food supplement with animal feeds.

This invention will be better understood from the following illustrative example of the best manner which I have as yet found of practicing it.

Fish entrails, first solubilized in fifteen percent of urea as described in my copending application, contain an amount of urea sufficient to solubilize the proteins and to prevent biological processes from occurring, thus preserving the entrails during the period of solubilization. To practice the process of this invention the urea concentration must be reduced to the point where it enhances cell growth.

To 1000 grams of solubilized protein produced by digesting fish entrails in fifteen percent of their weight of urea, according to the above-identified copending application, are added 1000 grams of water. To this mixture, which contains about 6.5% urea and which is in the fermentable range of urea concentration are added 200 grams of blackstrap molasses, containing 55% fermentable sugar. The addition of this amount of molasses reduces the urea concentration to about 5.8%. Yeast may now be added to this mixture and fermentation allowed to proceed to completion, whereby a considerable amount of the urea is assimilated by the yeast cells.

However, as already pointed out, it is preferable to establish conditions in the mixture most favorable to yeast growth, which includes an acidic medium, in order that the sugar is chiefly utilized by the yeast in their growth and multiplication process, rather than converted to alcohol and carbon dioxide. Accordingly, an acid is added, preferably sulfuric, to bring the pH down to between 4.5 and 5.5 prior to fermentation. Also, to the same end the mixture is excessively aerated during fermentation, as by bubbling air through it. Yeast may now be added as in the form and amount of an ordinary yeast cake. Fermentation thus proceeds under aerated and acidic conditions favorable to yeast cell growth.

An additional step, designed to further reduce the urea concentration and convert it to yeast cells, is the addition of urease to the mixture. This may be done before, during or after fermentation process. Preferably, the urease is added in such a manner that the ammonia which is generated is, as nearly as possible, entirely assimilated by the yeast. Optimum utilization of ammonia is provided by adding the urease gradually and in such increments that the ammonia is not generated faster than it can be assimilated by the yeast. The addition of urease is begun after fermentation has gotten under way and the rate of addition is coordinated with the amount of urea present and with the amount of yeast available to assimilate it.

As a source of urease, soya flour from which most of the oil has been extracted, is preferred. This product is sold commercially as extracted soya flour. The addition of about 2–4 percent soya flour, based on the weight of fermenting mixture, is generally sufficient, although greater amounts may be used. In the instant specific example 80 grams of urease are added in 10 gram increments at one and one-half hour intervals, the first addition being made two to three hours after the yeast was added.

The ammonia generated by the enzymatic hydrolysis of the urea is probably partly neutralized by the sulfuric acid used to acidify the mixture. However, the ammonium sulfate formed is also readily assimilated by the yeast. It will thus be seen that the urea is partly assimilated directly by the yeast, and partly converted to ammonia which is partly assimilated directly by the yeast and partly assimilated indirectly as ammonium sulfate. Fermentation at 28° C. is complete within from about eighteen to twenty-four hours.

Accordingly, the preferred manner of carrying out the process of this invention includes the five steps of first diluting the liquefied protein to reduce the urea concentration, second, adding a small amount of fermentable sugar, third, adjusting the pH to between 4.5 and 5.5, fourth, adding yeast and fermenting with aeration and fifth, adding the urease after fermentation has started.

It will be understood, however, that only the first and second steps, along with yeast fermentation are necessary to convert a considerable amount of the urea to yeast cells. The establishment of conditions favoring the utilization of sugar by the yeast are provided to minimize the conversion of sugar to alcohol, and urease is added to enhance the conversion of urea to yeast cells.

Fermentation is preferably effected by means of brewers yeast because of the high vitaminic content of its cells. However, other forms of yeast such as bakers yeast or torulae yeast are entirely satisfactory. It has further been found advisable to carry out the fermentation process under conditions preventive of contamination by other organisms. To this end the water and sugar containing material which are added, are first pasteurized, as by heating to 85° C. for one and one-half hours, and the air used for aeration is passed through a cotton filter.

The process of this invention may, if desired, be practiced in modified forms. For instance, the urease induced hydrolysis of urea and the fermentation may be conducted as separate reactions. In one container the urease may be allowed to react with the urea in the urea-protein mixture to convert it to ammonia and carbon dioxide, and in another container the sugar solution may be reacted upon by the yeast. The gases generated in the first container are piped to the sugar solution and there assimilated by the yeast in this growth process. The two solutions are finally mixed together or used separately if desired.

Alternatively, the urea-protein mixture may be treated with the urease and the gases collected and later returned when the sugar and yeast have been added and fermentation has started.

As a source of fermentable sugar, blackstrap molasses has been mentioned, but other well known fermentable sugar-containing materials may also be used, for instance, cane sugar, molasses, and sulfite liquids containing sugars from the hydrolysis of cellulose. Sulfite liquor may be used both to supply fermentable sugar and to dilute the solubilized protein-urea mixture to a urea concentration within the fermentable range.

After the urea has been removed, the proteinaceous material treated as described above may be dried to a light brownish powder. Not only is the product now considerably nutritionally enriched, but it has also lost its fishy odor, and is accordingly more acceptable as a food product.

Having thus disclosed my invention, I claim:

1. A process of rendering urea-solubilized animal tissues driable and of improved odor comprising treating the urea-solubilized animal tissues by the steps of adjusting the urea concentration to the fermentable range, adding fermentable sugar, introducing yeast and maintaining conditions favorable to yeast growth whereby the urea is assimilated by the yeast.

2. A process of rendering urea-solubilized animal tissues driable and of improved odor comprising treating the urea-solubilized animal tissues by the steps in any order of adjusting the urea concentration to the fermentable range by dilution, adding fermentable sugar, adjusting the pH at between 4.5 and 5.5, and also the final steps of introducing yeast and maintaining conditions favorable to yeast growth including aerating the mixture, whereby the urea is assimilated by the yeast.

3. A process of rendering urea-solubilized animal tissues driable and of improved odor comprising treating the urea-solubilized animal tissues by the steps in any order of adjusting the urea concentration to the fermentable range by dilution, adding fermentable sugar, and adjusting the pH to between 4.5 and 5.5, the subsequent steps of introducing yeast and maintaining conditions favorable to yeast growth including aerating the mixture, and the additional step of adding urease to the mixture at any time during the above defined process.

4. A process of rendering urea-solubilized animal tissues driable and of improved odor comprising treating the urea-solubilized animal tissues by the steps in any order of adjusting the urea concentration to the fermentable range by dilution, adding fermentable sugar, and adjusting the pH to between 4.5 and 5.5, the subsequent step of introducing yeast and maintaining conditions favorable to yeast growth including aerating the mixture, and the next step of adding urease to the mixture after fermentation has begun.

5. A process of rendering urea-solubilized animal tissues driable and of improved odor comprising treating the urea-solubilized animal tissues by the steps in any order of adjusting the urea concentration to the fermentable range by dilution, adding fermentable sugar, and adjusting the pH to between 4.5 and 5.5, the subsequent step of introducing yeast and maintaining conditions favorable to yeast growth including aerating the mixture, and the next step of adding urease to the mixture gradually at a rate coordinated with the amounts of yeast and urea present.

6. In the process of rendering urea-solubilized animal tissues driable and of improved odor the steps of providing in said solubilized tissues conditions favorable to yeast growth and adding yeast to said products.

7. In the process of rendering urea-solubilized animal tissues driable and of improved odor the step of adding urease to said solubilized tissues whereby urea is hydrolyzed to ammonia and carbon dioxide.

8. The process defined in claim 7 characterized by the additional steps of providing a fermenting mixture of sugar and yeast and introducing said ammonia into said fermenting mixture.

9. A process of rendering urea-solubilized animal tissues driable and of improved odor comprising treating the urea-solubilized animal tissues by the steps of providing a fermentable mixture adding yeast to said mixture, adding urease to said urea-containing products to convert the urea to ammonia and carbon dioxide, and introducing said ammonia into said fermentable mixture during the fermentation thereof.

10. A process of rendering urea-solubilized animal tissues driable and of improved odor comprising treating the urea-solubilized animal tissues by the steps of adding urease to said products to convert the urea to ammonia and carbon dioxide, providing a fermentable mixture, adding yeast to said mixture, and contacting said mixture with said ammonia, whereby the ammonia is assimilated by the yeast.

11. A process of converting the product of urea-solubilized animal tissues to a dry food product comprising the steps of adjusting the urea concentration to the fermentable range, adding fermentable sugar, introducing yeast and maintaining conditions favorable to yeast growth whereby the urea is assimilated by the yeast and finally drying the mixture.

12. A process of converting the product of urea-solubilized animal tissues to a dry food product comprising the steps in any order of adjusting the urea concentration to the fermentable range by dilution, adding fermentable sugar, adjusting the pH at between 4.5 and 5.5, the subsequent steps of introducing yeast and maintaining conditions favorable to yeast growth including aerating the mixture, whereby the urea is assimilated by the yeast, and finally drying the mixture.

13. A process of converting the product of urea-solubilized animal tissues to a dry food product comprising the steps in any order of adjusting the urea concentration to the fermentable range by dilution, adding fermentable sugar, and adjusting the pH to between 4.5 and 5.5, the subsequent steps of introducing yeast and maintaining conditions favorable to yeast growth including aerating the mixture, the additional step of adding urease to the mixture at any time during the above defined process, and finally drying the mixture.

14. A process of converting the product of urea-solubilized animal tissues to a dry food product comprising the steps in any order of adjusting the urea concentration to the fermentable range by dilution, adding fermentable sugar, and adjusting the pH to between 4.5 and 5.5, the subsequent step of introducing yeast and maintaining conditions favorable to yeast growth including aerating the mixture, the next step of adding urease to the mixture after fermentation has begun, and finally drying the mixture.

15. A process of converting the product of urea-solubilized animal tissues to a dry food product comprising the steps in any order of adjusting the urea concentration to the fermentable range by dilution, adding fermentable sugar, and adjusting the pH to between 4.5 and 5.5, the subsequent step of introducing yeast and maintaining conditions favorable to yeast growth including aerating the mixture, the next step of adding urease to the mixture gradually at a rate coordinated with the amounts of yeast and urea present, and finally drying the mixture.

16. The process of converting soft proteinaceous animal tissues to a supplemental food product comprising adding urea to the proteinaceous material in an amount sufficient to prevent biological decomposition, maintaining the urea and proteinaceous material in intimate admixture at substantial neutrality until solubilized, adjusting the urea concentration to the fermentable range, adding fermentable sugar, introducing yeast and maintaining conditions favorable to yeast growth whereby the urea is assimilated by the yeast.

17. The process of converting soft proteinaceous animal tissues to a supplemental food product comprising adding urea to the proteinaceous material in an amount sufficient to prevent biological decomposition, maintaining the urea and proteinaceous material in intimate admixture at substantial neutrality until solubilized, thereafter the steps in any order of adjusting the urea concentration to the fermentable range by dilution, adding fermentable sugar, and adjusting the pH at between 4.5 and 5.5, and the final steps of introducing yeast and maintaining conditions favorable to yeast growth including aerating the mixture, whereby the urea is assimilated by the yeast.

18. The process of converting soft proteinaceous animal tissues to a supplemental food product comprising adding urea to the proteinaceous material in an amount sufficient to prevent biological decomposition, maintaining the urea and proteinaceous material in intimate admixture at substantial neutrality until solubilized, thereafter the steps in any order of adjusting the urea concentration to the fermentable range by dilution, adding fermentable sugar, and adjusting the pH to between 4.5 and 5.5, the subsequent steps of introducing yeast and maintaining conditions favorable to yeast growth including aerating the mixture, and the additional step of adding urease to the mixture at any time after the mixture is solubilized.

19. The process of converting soft proteinaceous animal tissues to a supplemental food product comprising adding urea to the proteinaceous material in an amount sufficient to prevent biological decomposition, maintaining the urea and proteinaceous material in intimate admixture at substantial neutrality until solubilized, thereafter the steps in any order of adjusting the urea concentration to the fermentable range by dilution, adding fermentable sugar, and adjusting the pH to between 4.5 and 5.5, the subsequent step of introducing yeast and maintaining conditions favorable to yeast growth including aerating the mixture, and the next step of adding urease to the mixture after fermentation has begun.

20. The process of converting soft proteinaceous animal tissues to a supplemental food product comprising adding urea to the proteinaceous material in an amount sufficient to prevent biological decomposition, maintaining the urea and proteinaceous material in intimate admixture at substantial neutrality until solubilized, thereafter the steps in any order of adjusting the urea concentration to the fermentable range by dilution, adding fermentable sugar, and adjusting the pH to between 4.5 and 5.5, the subsequent step of introducing yeast and maintaining conditions favorable to yeast growth including aerating the mixture, and the next step of adding urease to the mixture gradually at a rate coordinated with the amounts of yeast and urea present.

References Cited in the file of this patent

UNITED STATES PATENTS

| 2,391,387 | Bradshaw et al. | Dec. 25, 1945 |
| 2,515,135 | Petty | July 11, 1950 |

OTHER REFERENCES

"The Yeasts" by Guilliermond, 1920, page 71.